(12) United States Patent
Lee et al.

(10) Patent No.: US 12,319,109 B2
(45) Date of Patent: Jun. 3, 2025

(54) STABILIZER BAR HYDRAULIC DISCONNECT

(71) Applicant: Schaeffler Technologies AG & Co. KG, Herzogenaurach (DE)

(72) Inventors: Brian Lee, Charlotte, NC (US); Kyle Syndergaard, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 172 days.

(21) Appl. No.: 18/119,310

(22) Filed: Mar. 9, 2023

(65) Prior Publication Data

US 2024/0300278 A1 Sep. 12, 2024

(51) Int. Cl.
*B60G 21/055* (2006.01)
*F16D 11/10* (2006.01)

(52) U.S. Cl.
CPC .......... *B60G 21/0556* (2013.01); *F16D 11/10* (2013.01); *B60G 2202/135* (2013.01); *B60G 2204/82* (2013.01); *B60G 2204/8302* (2013.01)

(58) Field of Classification Search
CPC ........ B60G 2202/413; B60G 2202/135; B60G 2206/427; B60G 21/0556
See application file for complete search history.

(56) References Cited

U.S. PATENT DOCUMENTS

| | | | |
|---|---|---|---|
| 5,749,596 A | 5/1998 | Jensen et al. | |
| 6,318,737 B1 | 11/2001 | Marechal et al. | |
| 6,428,019 B1 | 8/2002 | Kincad et al. | |
| 6,513,819 B1 * | 2/2003 | Oliver | B60G 21/0553 280/124.152 |
| 6,533,294 B1 | 3/2003 | Germain et al. | |
| 6,637,757 B2 | 10/2003 | Ignatius et al. | |
| 6,951,341 B1 * | 10/2005 | Beetz | B60G 21/0553 280/5.511 |
| 7,717,437 B2 | 5/2010 | Adams, III et al. | |
| 7,887,072 B2 | 2/2011 | Hauser et al. | |
| 8,109,522 B2 * | 2/2012 | Pinkos | B60G 3/20 280/124.152 |
| 11,161,386 B2 * | 11/2021 | Dhanraj | B60G 21/073 |
| 11,279,200 B2 | 3/2022 | Cavarec et al. | |
| 11,383,576 B2 | 7/2022 | Kellogg et al. | |
| 12,070,984 B1 * | 8/2024 | Lee | B60G 21/0556 |
| 2002/0121748 A1 * | 9/2002 | Ignatius | B60G 21/053 280/5.511 |

(Continued)

FOREIGN PATENT DOCUMENTS

| | | | |
|---|---|---|---|
| DE | 102019118045 A1 * | 1/2021 | |
| GB | 2220625 A | 1/1990 | |
| GB | 2309504 A | 7/1997 | |

OTHER PUBLICATIONS

Title: Active Stabilizer Bar Systems Web site: https://www.bwigroup.com/active-stabilizer-bar-systems/ Author: BWI Group Date: Jan. 1, 2022.

*Primary Examiner* — James A English
(74) *Attorney, Agent, or Firm* — Matthew V. Evans

(57) ABSTRACT

A stabilizer bar includes a housing configured to be fixed to a first side-bar, a hydraulic power unit and a clutch piston disposed within the housing, and a clutch ring configured to be fixed to a second side-bar. The hydraulic power unit is configured to selectively move the clutch piston from a first connected position to a second disconnected position.

19 Claims, 8 Drawing Sheets

(56) References Cited

U.S. PATENT DOCUMENTS

2008/0000710 A1\* 1/2008 Vortmeyer ......... B60G 21/0556
                                                180/282
2018/0086172 A1\* 3/2018 Breton .................... F16H 55/18
2021/0129619 A1\* 5/2021 Kellogg ............. B60G 21/0556
2023/0060076 A1   2/2023 Kraus et al.

\* cited by examiner

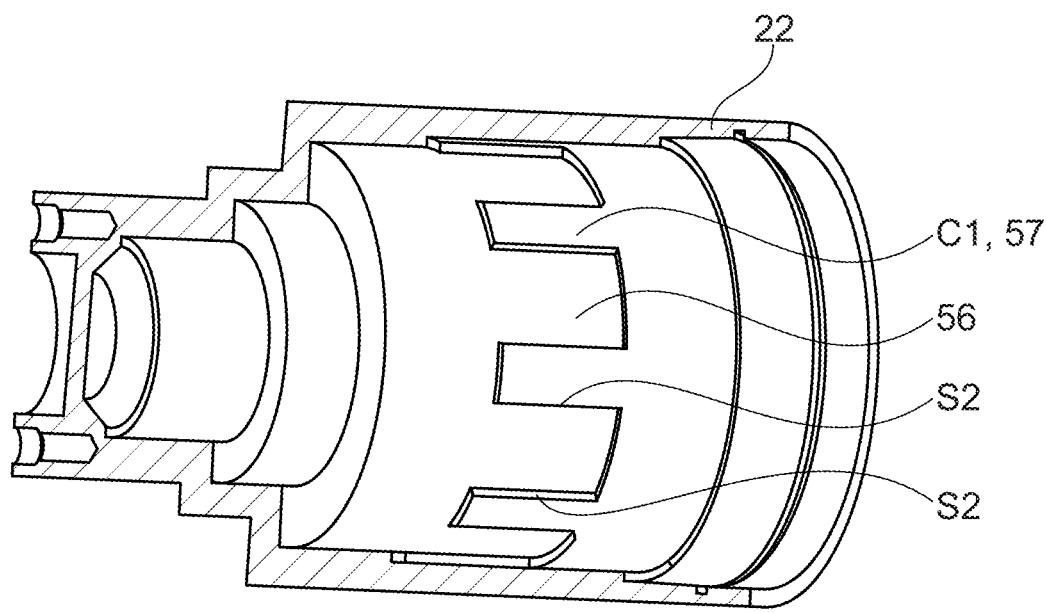
Fig. 6B
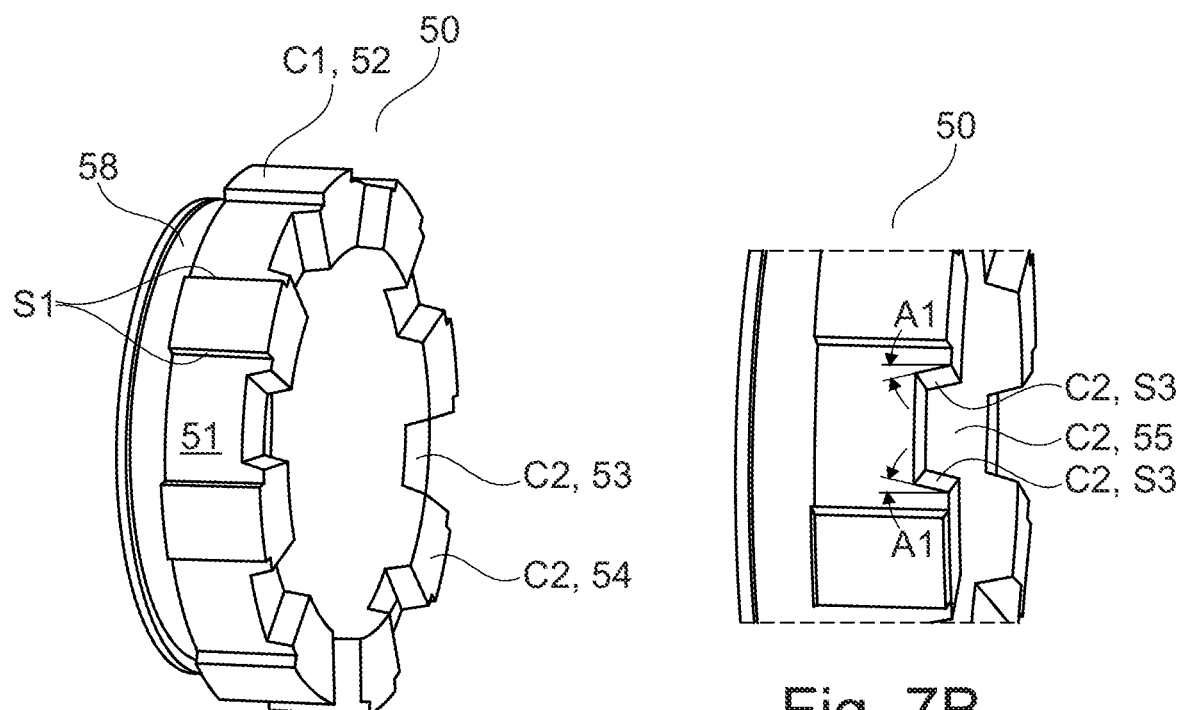
Fig. 7A
Fig. 7B

STABILIZER BAR HYDRAULIC DISCONNECT

TECHNICAL FIELD

The disclosure concerns a stabilizer bar for a vehicle. More particularly, the disclosure concerns a stabilizer bar which can be disconnected for improved off-road performance.

BACKGROUND

Many modern vehicle suspensions include stabilizer bars. Stabilizer bars can equalize a vertical movement of the left and right wheels relative to the vehicle frame or body. However, in some situations it can be desirable to have large vertical movement of a wheel on one side of the vehicle without a corresponding vertical movement on the other side. Independent movement of left and right wheels is helpful for keeping wheels on the ground and providing clearance over obstacles.

SUMMARY

An example embodiment of a vehicle stabilizer bar includes a housing configured to be fixed to a first side-bar, a hydraulic power unit installed within the housing, a clutch piston installed within the housing, and a clutch ring configured to be fixed to a second side-bar. The housing defines a first portion of a first coupling. The clutch piston defines a second portion of the first coupling and first portion of a second coupling. The clutch ring, concentrically arranged with the clutch piston, defines a second portion of the second coupling. The first coupling torsionally couples or connects the clutch piston to the housing while providing for axial movement between the clutch piston and the housing. The second coupling selectively torsionally couples or connects the clutch piston to the clutch ring such that in a first connected position the clutch piston is torsionally coupled or connected to the clutch ring, and in a second disconnected position, the clutch piston is torsionally uncoupled or disconnected from the clutch ring.

In an example embodiment, the first coupling continuously torsionally couples the housing to the clutch piston, meaning that the clutch piston is torsionally coupled to the housing in any axial position of the clutch piston.

In an example embodiment, the vehicle stabilizer bar includes a hydraulic fluid pump and an actuator that actuates the hydraulic fluid pump. One or more hydraulic fluid galleries fluidly connect the hydraulic fluid pump to the clutch piston. A solenoid valve is configured to control hydraulic fluid pressure within the at least one fluid gallery.

In an example embodiment, the hydraulic fluid pump includes an eccentric camshaft driven by the actuator and a plunger actuated by the eccentric camshaft. The actuation of the plunger increases the hydraulic fluid pressure within the one or more hydraulic fluid galleries.

In an example embodiment, the hydraulic power unit includes a hydraulic fluid reservoir arranged within the housing. In a further aspect, the hydraulic fluid reservoir is at least partially disposed within a recess of the clutch ring, the recess arranged radially inwardly of the coupling formed between the clutch piston and the clutch ring.

In an example embodiment, the hydraulic fluid reservoir is collapsible, pliable, or bladder-like.

In an example embodiment, the hydraulic power unit includes a gearbox that is drivably connected to the hydraulic fluid pump, and the actuator is drivably connected to the gearbox.

In an example embodiment, in the first connected position of the vehicle stabilizer bar, the clutch piston is torsionally coupled with the clutch ring via a first hydraulic fluid pressure, and in the second disconnected position, the clutch piston is torsionally uncoupled with the clutch ring via a second hydraulic fluid pressure less than the first hydraulic fluid pressure.

In an example embodiment, the vehicle stabilizer bar includes a solenoid valve that is fluidly connected to the one or more hydraulic fluid galleries, and in the first connected position the solenoid valve is closed, and in the second disconnected position the solenoid valve is open.

In an example embodiment, the hydraulic power unit and the clutch piston form a hydraulic chamber configured to move the clutch piston.

In an example embodiment, the solenoid valve is configured to selectively pressurize the one or more hydraulic fluid galleries to control a position of the clutch piston.

BRIEF DESCRIPTION OF THE DRAWINGS

FIG. 6B is a perspective cross-sectional view taken from FIG. 6A.

FIG. 7A is a perspective view of a clutch piston of the disconnect unit of FIG. 1.

FIG. 7B is a perspective view of a portion of the clutch piston of the disconnect unit of FIG. 1.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
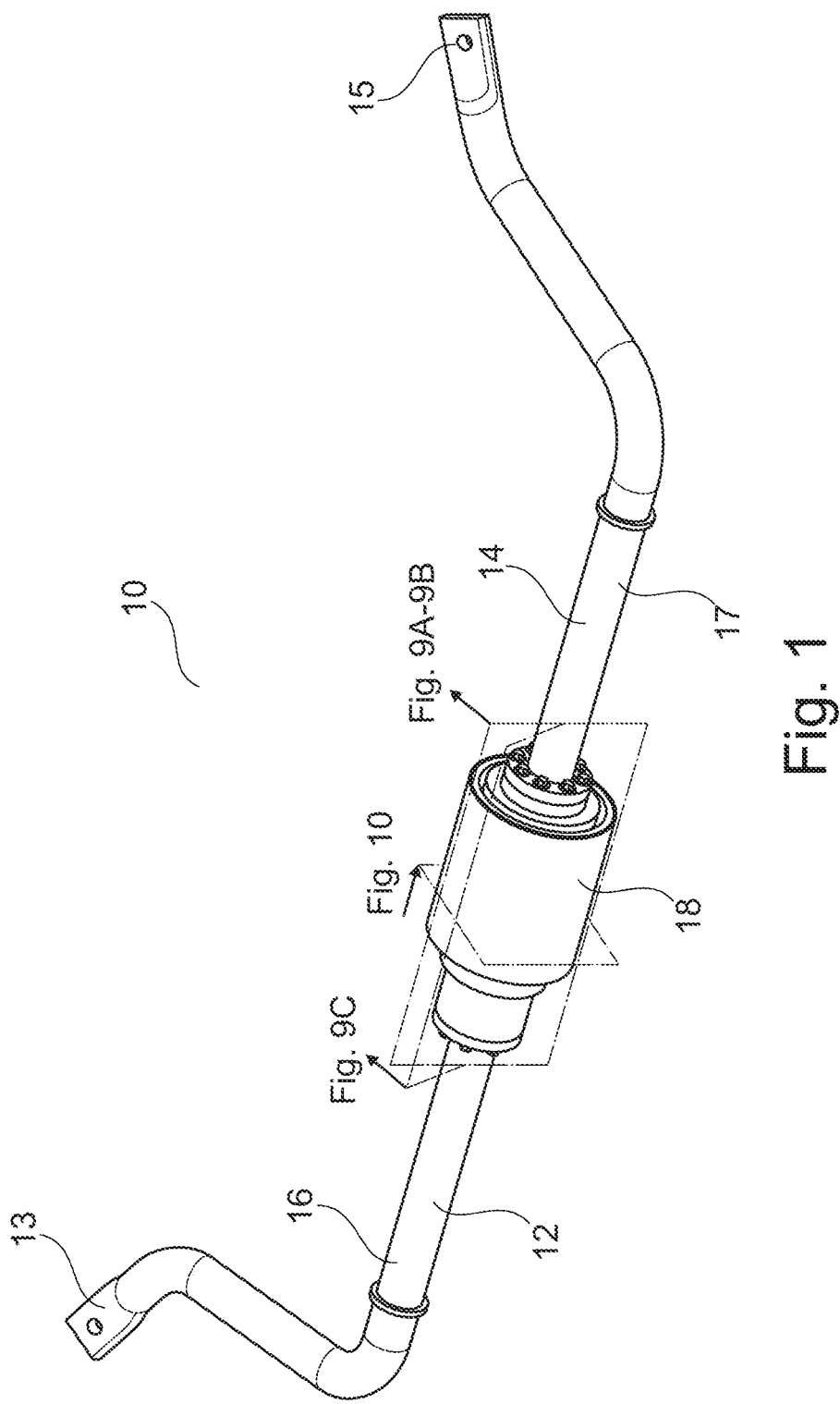
FIG. 1 is a perspective view of a stabilizer bar with a disconnect unit.
Figure 2:
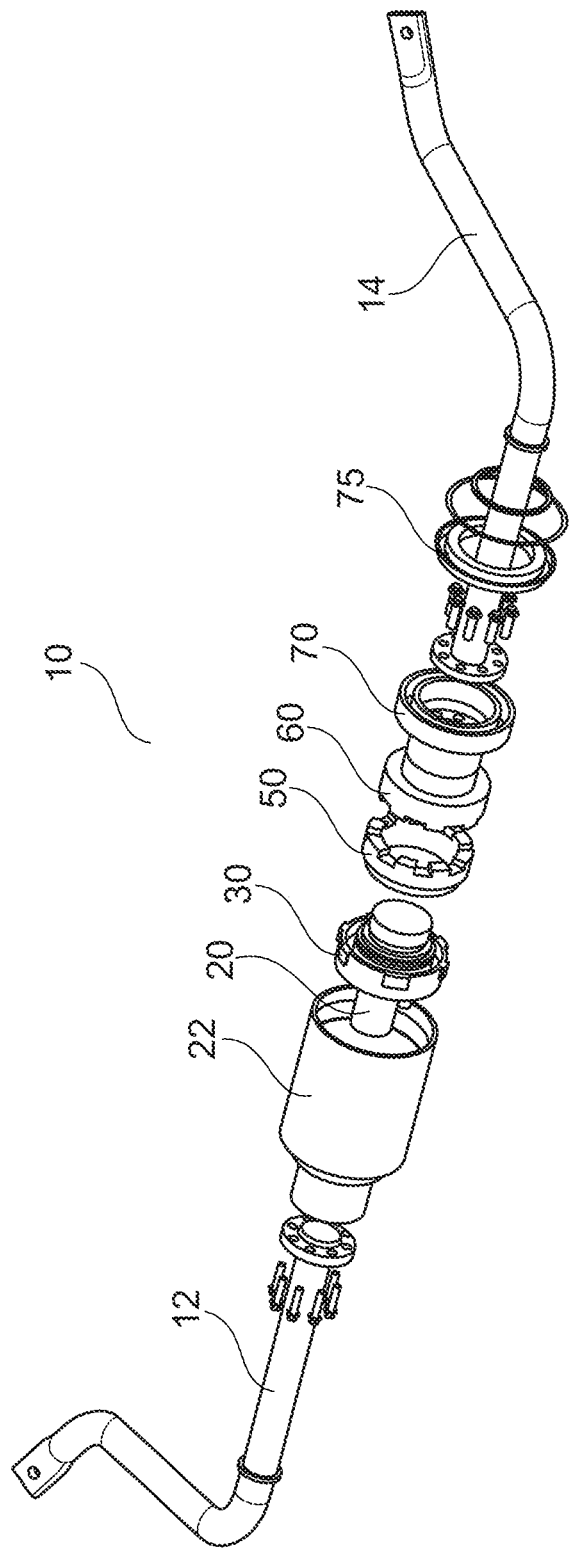
FIG. 2 is an exploded perspective view of the stabilizer bar and disconnect unit of FIG. 1.
Figure 3:
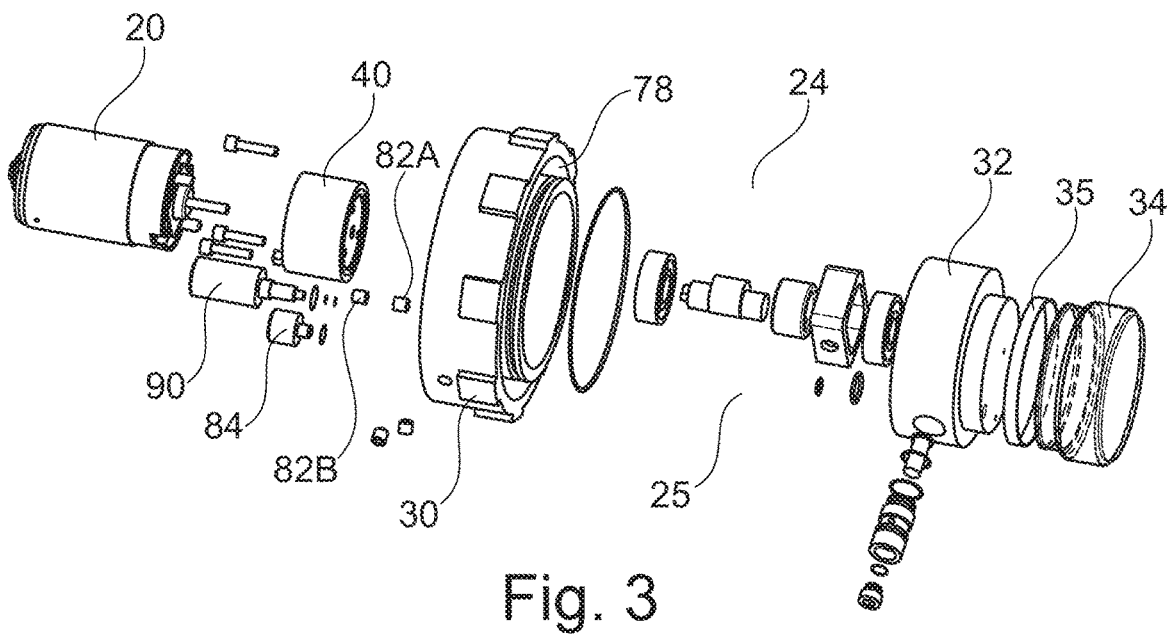
FIG. 3 is an exploded perspective view of a hydraulic power unit of the disconnect unit of FIG. 1.
Figure 4:
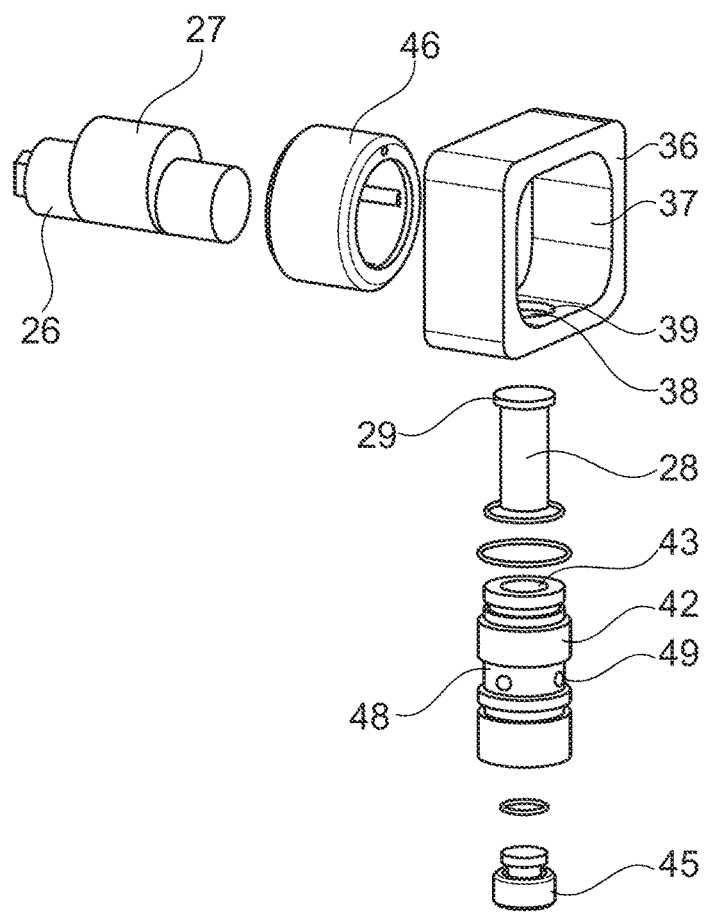
FIG. 4 is an exploded perspective view of an eccentric camshaft and plunger arrangement of the hydraulic power unit of FIG. 3.
Figure 5:
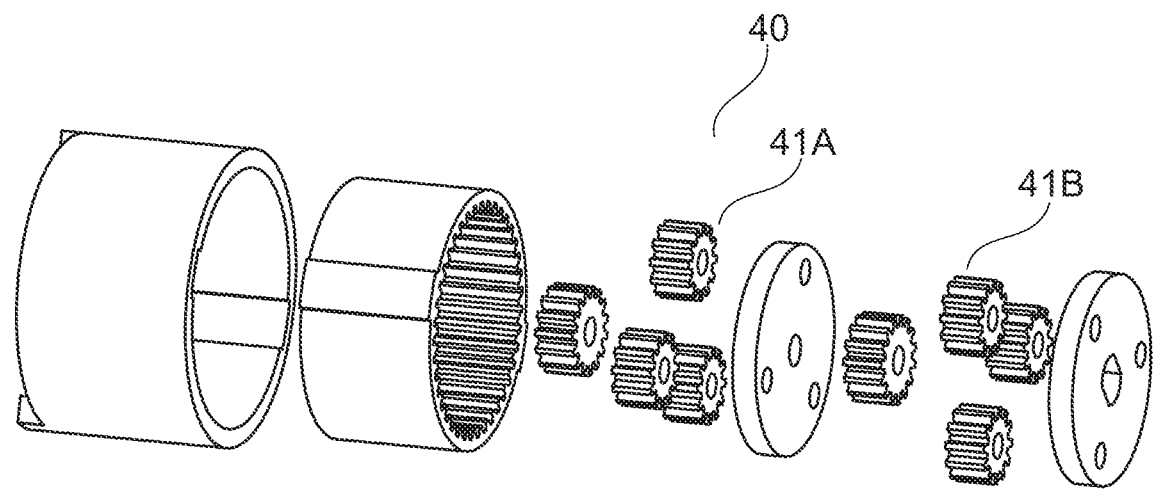
FIG. 5 is an exploded perspective view of a planetary gearbox of the disconnect unit of FIG. 1.
Figure 6A:
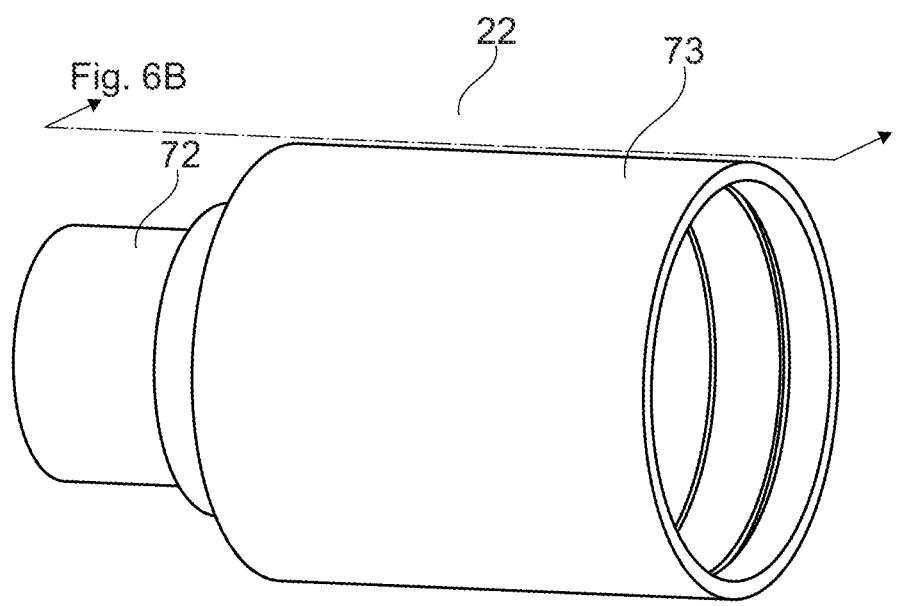
FIG. 6A is a perspective view of a housing of the disconnect unit of FIG. 1.
Figure 8A:
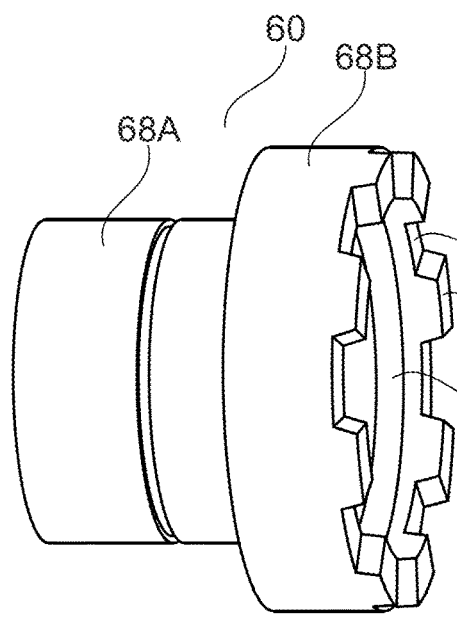
FIG. 8A is a perspective view of a clutch ring of the disconnect unit of FIG. 1.
Figure 8B:
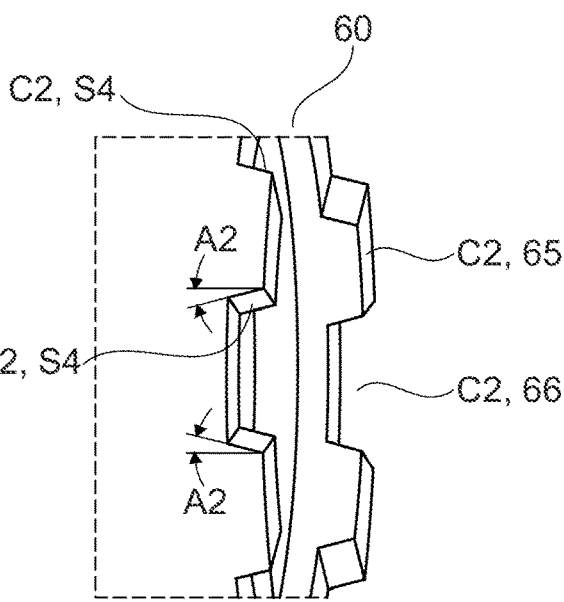
FIG. 8B is a perspective view of a portion of the clutch ring of the disconnect unit of FIG. 1.
Figure 9A:
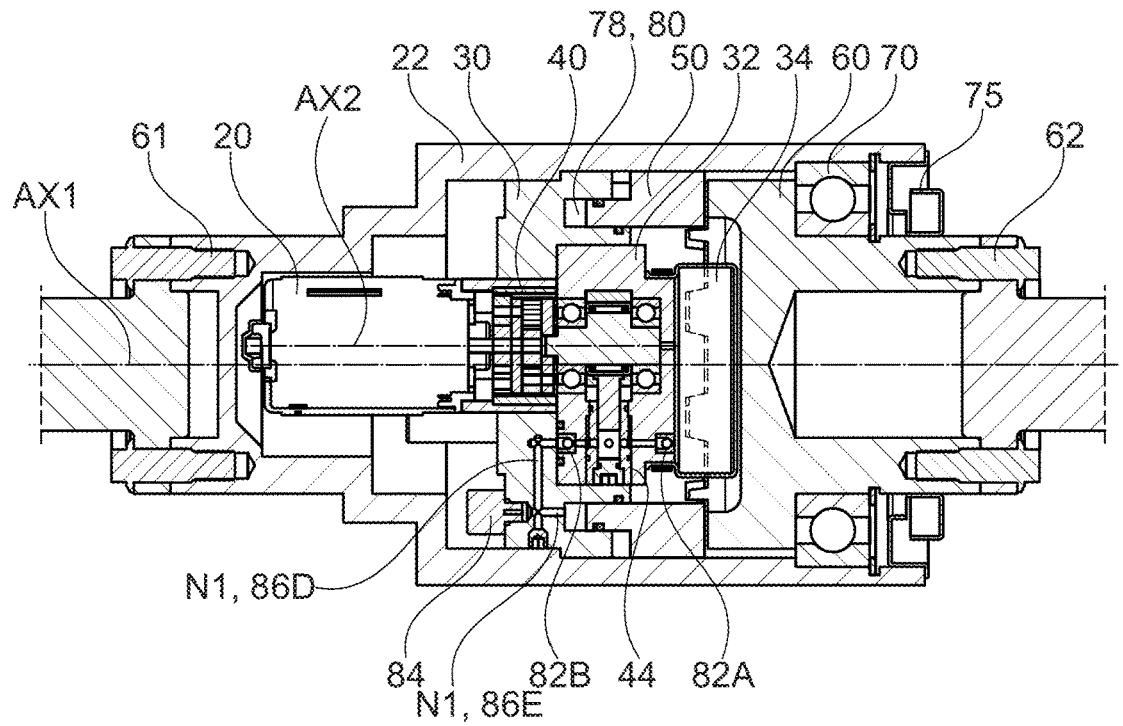
FIG. 9A is a cross-sectional view taken from FIG. 1.
Figure 9B:
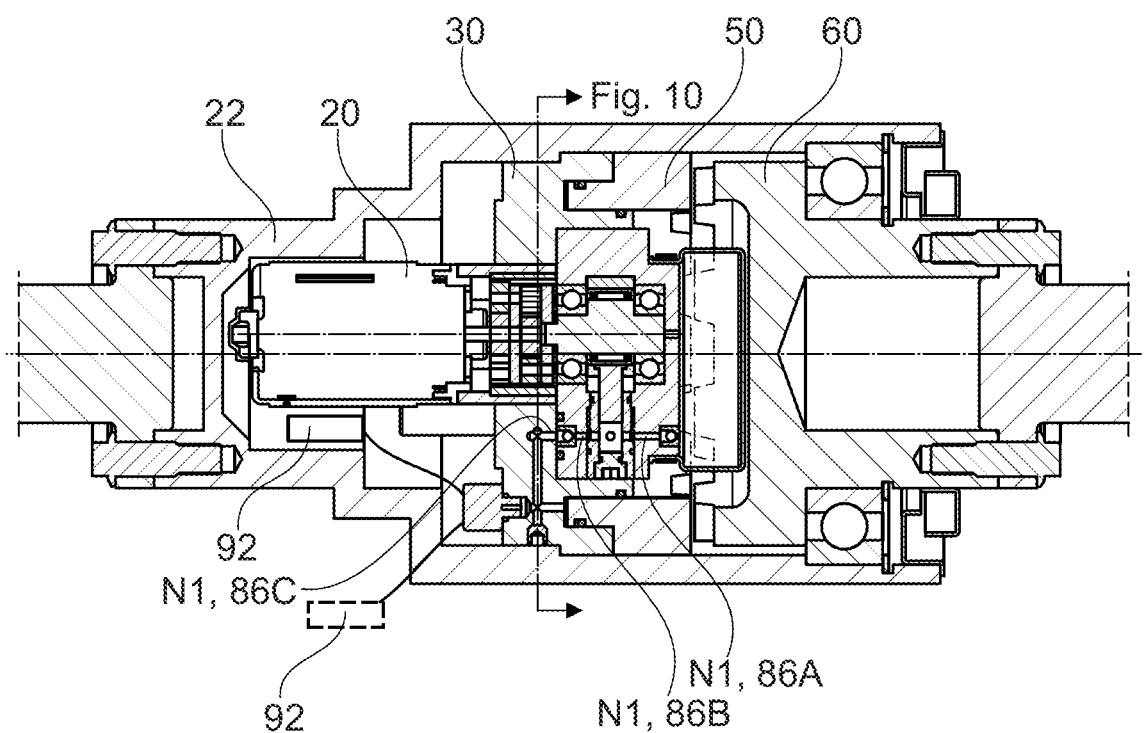
FIG. 9B is a cross-sectional view taken from FIG. 1.
Figure 9C:
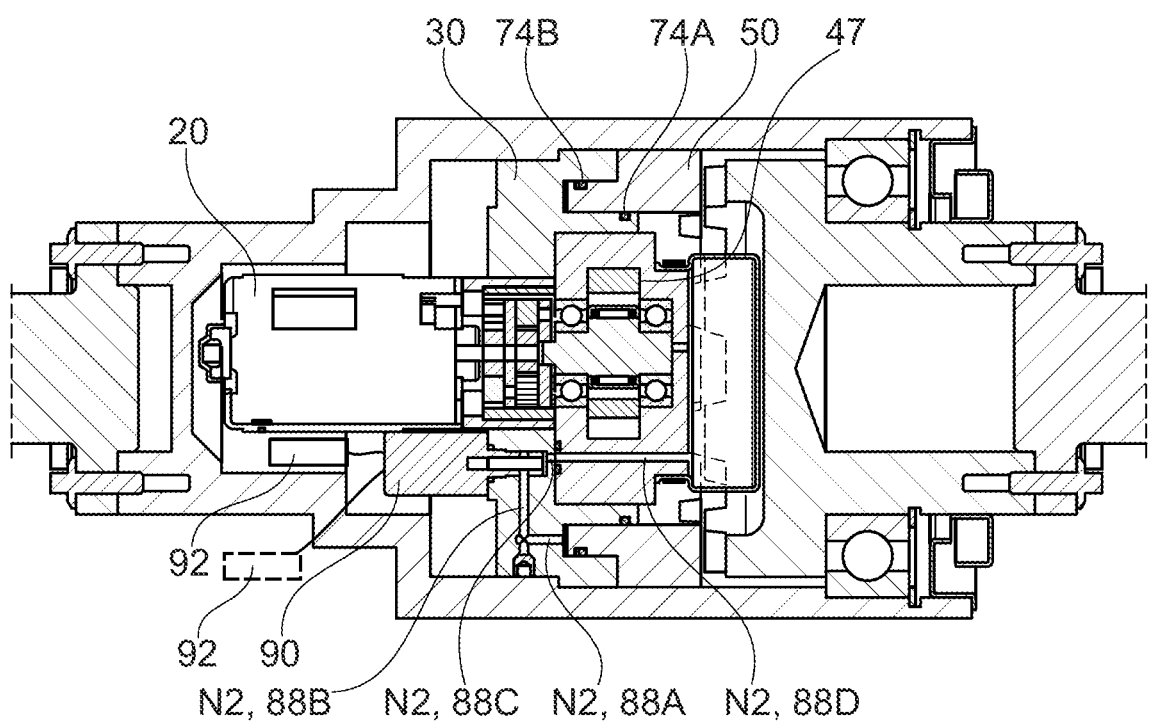
FIG. 9C is a cross-sectional view taken from FIG. 1.
Figure 10:
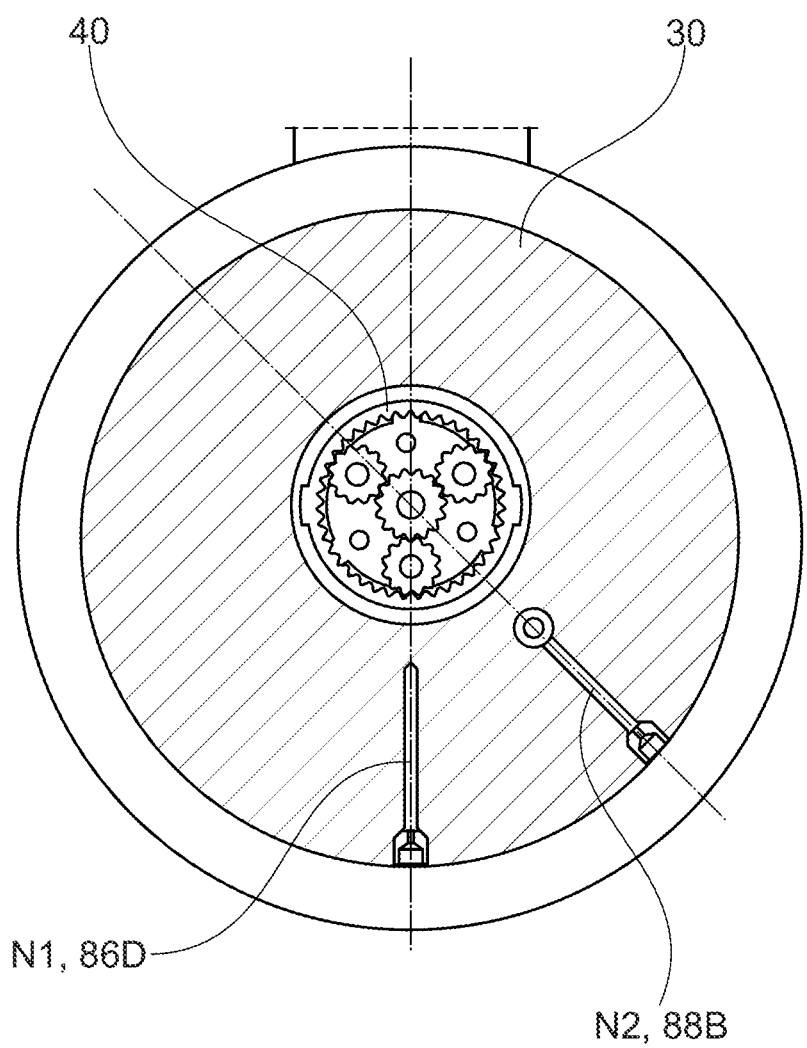
FIG. 10 is a cross-sectional view taken from FIG. 1.

FIGS. 1 and 2 show perspective views of a vehicle stabilizer bar 10 with a disconnect unit 18 in respective assembled and exploded states. FIG. 3 shows an exploded perspective view of a hydraulic power unit 24 of the disconnect unit 18 that includes a hydraulic fluid pump which can be described as a piston pump 25. FIG. 4 shows an exploded perspective view of a portion of a piston pump 25, the portion including an eccentric camshaft 26 and a pump plunger 28. FIG. 5 shows an exploded perspective view of a planetary gearbox 40 of the disconnect unit 18. FIG. 6A shows a perspective view of a housing 22 of the disconnect unit 18. FIG. 6B shows a perspective cross-sectional view of the housing 22. FIG. 7A shows a perspective view of a clutch piston 50 of the disconnect unit 18. FIG. 7B shows a perspective view of a portion of the clutch piston 50. FIG. 8A shows a perspective view of a clutch ring 60 of the disconnect unit 18. FIG. 8B shows a perspective view of a portion of the clutch ring 60 that meshes with the clutch piston 50. FIG. 9A shows a cross-sectional view of the disconnect unit 18 in a first connected state or position. FIG. 9B shows a cross-sectional view of the disconnect unit 18 in a second disconnected state or position. FIG. 9C shows a cross-sectional view of the disconnect unit 18 revealing a portion of fluid galleries within the hydraulic power unit 24. FIG. 10 shows a cross-sectional view of the disconnect unit 18. The following discussion should be read in light of FIGS. 1 through 10.

The stabilizer bar 10 includes a left side-bar 12 and a right side-bar 14. An outboard end 13 of the left side-bar 12 is connected to a left wheel suspension (not shown). Similarly, an outboard end 15 of the right side-bar 14 is connected to a right wheel suspension (not shown). The stabilizer bar 10 is connected to the vehicle frame or body (not shown) by mounting bushings (not shown) that support straight portions 16, 17 of the respective left and right side-bars 12, 14. The disconnect unit 18 selectively connects and disconnects the side-bars 12, 14 to one another torsionally. When the stabilizer bar 10 is in the first connected position or state, vertical displacement of one of the vehicle wheels imposes a torque on the corresponding side-bar. That torque is transmitted to the opposite side-bar and tends to displace the opposite wheel vertically in the same direction, resisting a tendency of the vehicle to tip when rounding a corner. When the stabilizer bar 10 is in the second disconnected position or state, no torque is transmitted via the stabilizer bar 10. The second disconnected position enables each wheel to displace vertically without impacting vertical displacement of the other wheel. A further discussion of how the disconnect unit 18 enables the first connected position and the second disconnected position now follows.

FIG. 9A shows the disconnect unit 18 in the first connected position. The left side-bar 12 is fixed to the housing 22 via fasteners 61 and the right side-bar 14 is fixed to a clutch ring 60 via fasteners 62. In the first connected position, the clutch piston 50 is engaged with and torsionally coupled to the clutch ring 60. Therefore, the left side-bar 12 is torsionally coupled to the right side-bar 14. The clutch ring 60 is supported within the housing 22 by a clutch ring bearing 70. The clutch ring bearing 70 serves to align the housing 22 and clutch ring 60 and also to allow relative rotation between the housing 22 and clutch ring 60.

The hydraulic power unit 24 is contained within the housing 22 and includes an electric motor 20, the planetary gearbox 40, a clutch manifold 30, the piston pump 25, and a hydraulic fluid reservoir 34. In order to torsionally couple the left side-bar 12 to the right side-bar 14, the hydraulic power unit 24 is energized to create hydraulic pressure within the clutch manifold 30 to axially move the clutch piston 50 so that it engages or meshes with the concentrically arranged clutch ring 60. Hydraulic pressure is created by energization of the electric motor 20 that is drivably connected to the piston pump 25 via the planetary gearbox 40. The piston pump 25 includes the eccentric camshaft 26 that has an eccentric 27 supported by an eccentric bearing 46 arranged within a camshaft opening 37 of a shuttle box 36. As the eccentric 27 rotates, the shuttle box 36 moves linearly within a channel 47 of a pump housing 32. The shuttle box 36 is coupled to a pump plunger 28 via a plunger landing 39 arranged within a plunger opening 38 of the shuttle box 36 that captures a head 29 of the pump plunger 28, therefore movement of the shuttle box 36 causes the pump plunger 28 to move in unison with the shuttle box 36. The plunger landing 39 could be described as a counterbore of the plunger opening 38. The pump plunger 28 moves linearly up and down (relative to FIGS. 9A and 9B) within a bore 43 of a plunger cylinder 42, arranged sealingly within a bore 44 of the pump housing 32 against a stop 45, to generate a hydraulic pressure that can axially move the clutch piston 50. The bore 43 of the plunger cylinder 42 is fluidly connected to the hydraulic fluid reservoir 34 via an outer annulus 48 and through-apertures 49 so that an upward motion of the pump plunger 28 draws hydraulic fluid into the bore 43 from the hydraulic fluid reservoir 34 and a downward motion of the pump plunger 28 "pumps" or pressurizes the hydraulic fluid out of the bore 43, annulus 48, and through-apertures 49 of the plunger cylinder 42, and through a first network of fluid galleries N1 that connect to a hydraulic chamber 80 formed between the clutch manifold 30 and the clutch piston 50.

Referring to FIGS. 9A-9B, the first network of fluid galleries N1 includes the following fluid galleries: a first fluid gallery 86A extending axially within the pump housing 32 that fluidly connects the hydraulic fluid reservoir 34 to the outer annulus 48 of the plunger cylinder 42 (via a first one-way valve 82A); a second fluid gallery 86B extending axially within the pump housing 32 from the bore 44 of the pump housing 32 to an axial end face of the pump housing 32 (via a second one-way valve 82B); a third fluid gallery 86C extending axially within the clutch manifold 30; a fourth fluid gallery 86D extending radially inwardly within the clutch manifold 30 from the third fluid gallery 86C; and a fifth fluid gallery 86E extending axially within the clutch manifold 30 from the fourth fluid gallery 86D to the hydraulic chamber 80. The fifth fluid gallery 86E is fluidly connected to a pressure transducer 84 (or pressure sensor) mounted on the clutch manifold 30, which measures a working hydraulic fluid pressure of the first network of fluid galleries N1. The pressure transducer 84 can provide electronic feedback to an electronic control unit 92 or any other feedback receiver as to whether a target working hydraulic fluid pressure is achieved and thus be utilized to control energization of the electric motor 20. The electronic control unit 92 can be located either inside or outside of the housing 22 as shown in FIG. 9B.

A second network of fluid galleries N2 fluidly connects the hydraulic chamber 80 to the hydraulic fluid reservoir 34. Referring to FIG. 9C, the second network of fluid galleries N2 includes the following fluid galleries: a first fluid gallery 88A extending axially from the hydraulic chamber 80 within the clutch manifold 30; a second fluid gallery 88B extending radially inwardly within the clutch manifold 30 from the first fluid gallery 88A to a solenoid valve 90 mounted on the clutch manifold 30; a third fluid gallery 88C extending axially from the solenoid valve 90 to an axial end face of the clutch manifold 30; and, a fourth fluid gallery 88D extending axially through the pump housing 32 to the hydraulic fluid reservoir 34. The second network of fluid galleries N2 is fluidly connected to the first network of fluid galleries N1 via both the hydraulic fluid reservoir 34 and the hydraulic chamber 80. The solenoid valve 90 can be electronically controlled via electronic communication by the electronic control unit 92 that is located either inside or outside of the housing 22 as shown in FIG. 9C. The solenoid valve 90 is closed when a high fluid gallery pressure is desired, such as that a resultant force of the pressure will act upon and move the clutch piston 50 until it engages or meshes with the clutch ring 60 to achieve the first connected position. When it is desired to open or move the clutch piston 50 to the second disconnected position, the solenoid valve 90 is opened to dump the high pressure fluid back into the hydraulic fluid reservoir 34. The solenoid valve can be electronically controlled by an electronic control unit either inside or outside of the housing 22. Therefore, the first and second network of fluid galleries N1, N2 have a higher hydraulic fluid pressure in the first connected position than in the second disconnected position. The clutch piston 50 and the clutch ring 60 have mating teeth with angled interfaces. When a torque is applied to the stabilizer bar 10 after the aforementioned gallery depressurization, the angled interfaces force the clutch piston 50 out of engagement with the clutch ring 60 and thus the second disconnected position is achieved as shown in FIG. 9B.

The clutch piston 50 and the housing 22 define a first torsional coupling C1. The first torsional coupling C1 includes an array of slots 57 or depressions arranged on a radial inner surface 56 of the housing 22 (defining a first portion of the first torsional coupling C1), and an array or group of radial protrusions 52 arranged on a radial outer surface 51 of the clutch piston 50 (defining a second portion of the first torsional coupling C1) that slidably engage the slots 57. The radial protrusions 52 could also be described as a circumferential array of teeth or outcroppings that define a radial outer-most surface of the clutch piston 50. Each of the radial protrusions 52 and the slots 57 are defined by respective straight sides S1, S2, as shown in FIGS. 6B and 7A; the straight sides S1 of the clutch piston 50 are slidably guided by the straight sides S2 of the housing 22. The first torsional coupling C1 could be described as a castling interface. The first torsional coupling C1 continuously torsionally couples the clutch piston 50 to the housing 22 in any axial position of the clutch piston 50. Other suitable forms of the first torsional coupling C1 are also possible other than what is described here and shown in the figures.

The clutch piston 50 and the clutch ring 60 define a second torsional coupling C2. The clutch piston 50 includes an array or group of axial protrusions 54 or teeth arranged on an axial end face 53 of the clutch piston 50. Each axially extending side S3 or surface of the axial protrusions 54 are tapered or angled toward each other, defining an angle A1. Two successive axial protrusions 54 form a depression 55 defined by the axial end face 53 that includes the axially extending sides S3. It could be stated that each axial protrusion 54 is separated by a depression 55 or that the axial protrusions 54 and depressions 55 are arranged in an alternating pattern around the axial end face 53 of the clutch piston 50. The axial protrusions 54, depressions 55, axial end face 53, and the corresponding sides S3 or surfaces define a first portion of the second torsional coupling C2.

The clutch ring 60 includes a first cylindrical segment 68A and a second cylindrical segment 68B. The first cylindrical segment 68A is supported by the clutch ring bearing 70. The second cylindrical segment 68B includes a recess 63 that houses the hydraulic fluid reservoir 34 and an array or group of axial protrusions 65 or teeth arranged on an axial end face 64 of the second cylindrical segment 68B. The recess 63 can be described as bowl-shaped, with the axial end face 64 formed on a rim of the bowl. Each axially extending side S4 or surface of the axial protrusions is tapered or angled toward each other, defining an angle A2, which may or may not be the same as the previously described angle A1 of the clutch piston 50 axial protrusions 54. Two successive axial protrusions 65 form a depression 66 defined by the axial end face 64 that includes the axially extending sides S4. It could be stated that each axial protrusion 65 is separated by a depression 66 or that the axial protrusions 65 and depressions 66 are arranged in an alternating pattern around the axial end face 64 of the clutch ring 60. The axial protrusions 65, depressions 66, axial end face 64, and the corresponding sides S4 or surfaces define a second portion of the second torsional coupling C2.

In the first connected position, the axial protrusions 54 of the clutch piston 50 mesh with the depressions 66 of the clutch ring 60, and the axial protrusions 65 of the clutch ring 60 mesh with the depressions 55 of the clutch piston 50. The term "mesh" signifies a torsional coupling or interlocking of the protrusions 54, 65 and corresponding depressions 55, 66, similar to that of a dog clutch. In the first connected position, the tapered sides S3 of the axially extending protrusions 54 of the clutch piston 50 are circumferentially adjacent to and engaged with the tapered sides S4 of the axially extending protrusions 65 of the clutch ring 60. In an example embodiment, the axially extending protrusions 54 of the clutch piston 50 engage the axial end face 64 of the clutch ring 60 in the first connected position. Alternatively, in a further example embodiment, the axially extending protrusions 65 of the clutch ring 60 engage the axial end face 53 of the clutch piston 50 in the first connected position. The tapered interface between the clutch piston 50 and clutch ring 60 facilitates a torsional sliding separation of these two components when torque is applied to the stabilizer bar 10 after a depressurization of the first and second network of fluid galleries N1, N2, accomplished via the solenoid valve 90.

The clutch manifold 30 is configured to house the planetary gearbox 40 and the piston pump 25 while forming the hydraulic chamber 80 with the clutch piston 50. The clutch manifold 30 is fixed to the pump housing 32. The clutch manifold 30 includes an annular groove 78 that slidably and sealingly receives a cylindrical rim 58 of the clutch piston 50. An inner ring seal 74A and an outer ring seal 74B are arranged radially between the clutch piston and annular groove 78. Together, the annular groove 78 and the rim 58 of the clutch piston form the hydraulic chamber 80. An axial length of the hydraulic chamber 80 increases as the clutch piston 50 moves axially from the first connected position to the second disconnected position.

As shown in FIGS. 9A and 9B, within the first network of fluid galleries N1, the pump housing 32 includes the first one-way valve 82A installed within the first fluid gallery 86A and the second one-way valve 82B installed within the second fluid gallery 86B. The first one-way valve 82A opens towards the outer annulus 48 of the plunger cylinder 42 and the second one-way valve 82B opens towards the clutch manifold 30. During an upward stroke of the pump plunger 28, the first one-way valve 82A is open, the second one-way valve 82B is closed, and hydraulic fluid is drawn into the bore 43 of the plunger 42 from the hydraulic fluid reservoir 34. During a downward stroke of the pump plunger 28, the first one-way valve 82A is closed and the second one-way valve 82B is open to facilitate communication of pressurized hydraulic fluid to the hydraulic chamber 80 via the third, fourth, and fifth fluid galleries 86C-86E.

The hydraulic fluid reservoir 34 is attached to an end of the pump housing 32 via a retention band 35. The hydraulic fluid reservoir 34 extends axially from the end of the pump housing 32 into the recess 63 of the clutch ring 60. The hydraulic fluid reservoir 34 houses hydraulic fluid for actuation of the clutch piston 50. The hydraulic fluid reservoir 34 is fluidly connected to the first network of fluid galleries N1 via the first fluid gallery 86A and to the second network of fluid galleries N2 via the fourth fluid gallery 88D. In an example embodiment, the hydraulic fluid reservoir 34 is a pliable or collapsible bladder. In a further example embodiment, the hydraulic fluid reservoir 34 is pliable and interfaces with at least a portion of the recess 63 of the clutch ring 60 to form a same shape as the portion of the recess 63. The hydraulic fluid reservoir 34 facilitates a self-contained hydraulic power unit 24, meaning that it does not require a fluid connection to a hydraulic fluid source or hydraulic fluid pump. Furthermore, the hydraulic fluid reservoir 34 could be pressurized to a pressure below that which will actuate the clutch piston 50.

The housing 22 of the disconnect unit 18 is closed at a motor end 72 and open at a clutch ring end 73. The housing 22 is sealed to prevent an ingress of contaminants and leakage of hydraulic fluid via a seal 75 installed at the clutch ring end 73. The seal 75 allows rotation of the clutch ring 60 relative to the pump housing 32. The left side-bar 12 is fastened to the motor end 72 of the housing 22 via fasteners 61 and the right side-bar 14 is fastened to the first cylindrical segment 68A of the clutch ring 60 via fasteners 62.

The gearbox 40 includes two drivably connected adjacent planetary gearsets 41A, 41B that provide speed reduction of the electric motor 20 (or a shaft thereof) for driving the piston pump 25. Such planetary gearsets are known within the vehicle powertrain landscape, therefore, further discussion is not necessary. Other suitable gearbox types and arrangements that provide adequate speed reduction and/or torque multiplication are also possible.

FIG. 9A shows a rotational axis AX1 about which the housing 22 of the disconnect unit 18, and any component that is torsionally coupled to the housing 22, rotates. A rotational axis AX2 of the eccentric camshaft 26 and a shaft of the electric motor 20 is also shown in FIG. 9A which is radially offset from the rotational axis AX1. In a further example embodiment, both rotational axes AX1, AX2 are aligned.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle stabilizer bar comprising:
    a housing configured to be fixed to a first side-bar, the housing defining a first portion of a first coupling;
    a hydraulic power unit disposed within the housing;
    a clutch piston disposed within the housing, the clutch piston defining:
        a second portion of the first coupling configured to cooperate with the first portion of the first coupling, such that the first coupling: i) torsionally couples the clutch piston to the housing, and ii) provides for axial movement between the clutch piston and the housing; and
        a first portion of a second coupling;
    a clutch ring configured to be fixed to a second side-bar, the clutch ring defining a second portion of the second coupling, the second coupling configured to cooperate with the first portion of the first coupling to selectively torsionally couple the clutch piston to the clutch ring; and
    the hydraulic power unit is configured to selectively move the clutch piston from a first connected position, in which the clutch piston is torsionally coupled to the clutch ring, to a second disconnected position, in which the clutch piston is torsionally uncoupled from the clutch ring.

2. The vehicle stabilizer bar of claim 1, wherein the clutch piston is configured to move axially via the hydraulic power unit.

3. The vehicle stabilizer bar of claim 2, wherein the first coupling continuously torsionally couples the housing to the clutch piston.

4. The vehicle stabilizer bar of claim 1, wherein the hydraulic power unit further comprises:
    a hydraulic fluid pump;
    an actuator configured to actuate the hydraulic fluid pump;
    at least one fluid gallery fluidly connecting the hydraulic fluid pump to the clutch piston; and
    a solenoid valve configured to control a hydraulic fluid pressure within the at least one fluid gallery.

5. The vehicle stabilizer bar of claim 4, wherein the hydraulic fluid pump further comprises:

an eccentric camshaft driven by the actuator; and a plunger actuated by the eccentric camshaft; and actuation of the plunger increases the hydraulic fluid pressure within the at least one fluid gallery.

6. The vehicle stabilizer bar of claim 4, wherein the hydraulic power unit further comprises a hydraulic fluid reservoir arranged within the housing.

7. The vehicle stabilizer bar of claim 6, wherein the hydraulic fluid reservoir is at least partially disposed within the clutch ring.

8. The vehicle stabilizer bar of claim 6, wherein the hydraulic fluid reservoir is collapsible.

9. The vehicle stabilizer bar of claim 6, wherein the hydraulic power unit further comprises a gearbox, and:

the actuator is drivably connected to the gearbox; and the gearbox is drivably connected to the hydraulic fluid pump.

10. A vehicle stabilizer bar comprising:

a housing configured to be fixed to a first side-bar;

a hydraulic power unit disposed within the housing, the hydraulic power unit having an actuator, a hydraulic fluid pump, and at least one fluid gallery;

a clutch piston disposed within and torsionally coupled to the housing via a first coupling, the clutch piston configured to be selectively hydraulically actuated by the hydraulic power unit; and a clutch ring at least partially disposed within the housing and configured to be fixed to a second side-bar; and in a first connected position, the clutch piston is torsionally coupled with the clutch ring via a first hydraulic fluid pressure and a second coupling; and in a second disconnected position, the clutch piston is torsionally uncoupled with the clutch ring via a second hydraulic fluid pressure less than the first hydraulic fluid pressure and the second coupling.

11. The vehicle stabilizer bar of claim 10, further comprising a solenoid valve fluidly connected to the at least one fluid gallery, and in the first connected position the solenoid valve is closed, and in the second disconnected position the solenoid valve is open.

12. The vehicle stabilizer bar of claim 11, wherein the hydraulic power unit further comprises a hydraulic fluid reservoir fluidly connected to the at least one fluid gallery.

13. The vehicle stabilizer bar of claim 12, wherein the hydraulic fluid reservoir is disposed within a recess of the clutch ring.

14. The vehicle stabilizer bar of claim 10, wherein the hydraulic power unit and the clutch piston form a hydraulic chamber configured to move the clutch piston.

15. A vehicle stabilizer bar comprising:

a rotational axis;

a housing configured to be fixed to a first side-bar;

a hydraulic power unit disposed within the housing, the hydraulic power unit having:

at least one fluid gallery;

a hydraulic fluid pump fluidly connected to the at least one fluid gallery;

an actuator configured to power the hydraulic fluid pump;

a gearbox arranged between the actuator and the hydraulic fluid pump; and a hydraulic fluid reservoir fluidly connected to the at least one fluid gallery;

a clutch piston slidably disposed within the housing and the hydraulic power unit, the clutch piston fluidly connected to the at least one fluid gallery and configured to be selectively hydraulically actuated by the hydraulic power unit;

a clutch ring at least partially disposed within the housing and arranged concentrically with the clutch piston; and in a first connected axial position, the clutch piston is torsionally coupled with the clutch ring; and in a second disconnected axial position, the clutch piston is torsionally uncoupled with the clutch ring.

16. The vehicle stabilizer bar of claim 15, further comprising a coupling formed by the clutch piston and the clutch ring and the coupling includes a first plurality of tapered surfaces on the clutch piston configured to engage a second plurality of tapered surfaces on the clutch ring.

17. The vehicle stabilizer bar of claim 16, wherein the hydraulic fluid reservoir is arranged radially inwardly of the coupling.

18. The vehicle stabilizer bar of claim 15, wherein the actuator is an electric motor.

19. The vehicle stabilizer bar of claim 15, wherein the hydraulic power unit further comprises a solenoid valve configured to selectively pressurize the at least one fluid gallery.

* * * * *